Patented June 21, 1938

2,121,459

UNITED STATES PATENT OFFICE 2,121,459

SEPARATION OF AMYLASE AND PROTEASE

Ernst Waldschmidt-Leitz, Prague, Czechoslovakia, and Fritz Ziegler, Wuppertal-Elberfeld, Germany, assignors to Röhm & Haas Company, Philadelphia, Pa.

No Drawing. Application August 17, 1935, Serial No. 36,650

6 Claims. (Cl. 195—66)

This invention relates generally to the preparation of materials containing the enzyme diastase or amylase, more specifically to the preparation of such diastatic materials in which the activity of the enzyme protease is considerably less than in any similar materials available at present.

For many industrial purposes the number of diastatic materials at present available which may be used with safety is limited by the fact that they contain proteases. When more than a certain amount of such material is used, the protease activity assumes harmful proportions. It is obvious, therefore, that diastatic preparations with less than the usual amount of protease activity would find increased usefulness.

It is an object of this invention to prepare diastatic materials of considerably reduced protease activity. A further object is to prepare diastatic materials which are substantially free from protease. It is a further object to prepare a protease material which is substantially free of amylase.

Our invention is applicable to the diastases of well-known origin such as animal glands, malted grains, molds and bacteria. We have found that by adding certain adsorbents to an aqueous solution or suspension of the mixed enzymes, it is possible to remove substantially all of the protease and to leave the amylase in suspension. After the solution or suspension of the mixed enzymes has been treated with an adsorbent and filtered it will be found that although the amylase activity is substantially the same as before treatment the protease activity has been considerably reduced and can be practically eliminated.

It is well-known that the mixture of enzymes obtained from extracts of the pancreas gland can be separated from each other by adsorption. This has been done by Willstätter and Waldschmidt-Leitz (Zeitschrift fur Physiologische Chemie, vol. 126, pages 132, 143 (1923)). By use of appropriate adsorbents, such as specially prepared aluminum hydroxide, kaolin, tristearin and cholesterol, and adjusting the solutions to appropriate pH values, they were able to separate the protease, lipase and amylase from each other.

Up to the present, however, no one has succeeded in separating the protease from the amylase in enzyme mixtures obtained from malted grains, molds and bacteria. It is well-known that, although all enzymes of the same class, such, for example, as proteases, will hydrolyze proteins, the nature and character of the proteases vary with their origin. Therefore, it was not to be expected that the methods for separating the pancreatic enzymes would apply to the separation of enzymes from plant sources, such as malted grains, molds and bacteria. This was found to be the case, and the present invention discloses a new method of separating the protease from the amylase found in these plant sources. Furthermore, it has previously been thought necessary to use an especially prepared aluminum hydroxide. We have discovered that certain natural aluminum minerals, such as bauxite, $Al_2O(OH)_4$, are also efficient, selective adsorbents towards protease of such origins. Also, it has been found that bauxites from various sources vary in their efficiency as adsorbents.

It has further been found that the adsorbents do not become saturated as regards protease during their first use, and hence they can be used a second and third and even more times on successive lots of enzyme solution. Thus, a counter-current system of adsorption can be devised whereby the most nearly saturated lot of adsorbent is used on the untreated enzyme solution, and the fresh adsorbent used on solutions which already have been treated several times by partly saturated adsorbents. This makes for a very efficient use of the adsorbents. Conversely, if the operator prefers, he may add sufficient fresh adsorbent to bring out the desired amylase-protease ratio in one treatment, as shown in Example 1.

It has further been found that, although the adsorbents when first used adsorb a small amount of amylase, they quickly become saturated and during their subsequent successive uses will not only not take up any further amylase but will actually release some of it to the solution, as is shown in Examples 2, 3 and 5. The amylase can also be washed off the adsorbent by water, preferably at pH 5.5 to 6.5.

The protease may also be recovered from the adsorbent by eluting the latter at an appropriate hydrogen ion concentration, as shown in Example 10.

We have also discovered that a malt extract in which the amylase : protease ratio has been increased by treatment with the adsorbent, may undergo a still further increase of this ratio simply by evaporating the solution at 30° C. and if desired at subatmospheric pressure to a syrup. In some cases we have found that the amylase: protease ratio of the treated solution is doubled by this concentrating operation.

The efficiency and specificity of adsorption by aluminum oxides is considerably affected by the pH of the enzyme solutions. It is preferable to work between pH 5.5 and 7.5 with limits between pH 4 and 9. In practice, the pH of the enzyme solutions is adjusted to the desired point in the usual manner, either by adding acid or alkali, or acid or alkaline salts.

The temperature of the enzyme solutions is preferably kept below 40° C. so that it will exert no harmful action on any of the enzymes present. The time of contact with the adsorbent is unimportant, a few minutes sufficing, although more time will do no harm. Thorough mixing of the adsorbent with the enzyme solution is necessary.

The more finely ground the adsorbent, the more efficient is its action. In one case Chattanooga bauxite was ground to 125 and 250 mesh sizes. When 5 gm. of each was stirred into 25 cc. of malt extract, the finer portion was 50% more effective in increasing the amylase-protease ratio.

The concentration of the enzyme solution to be treated is immaterial, provided it is not so high as to interfere with action of the adsorbent.

Various ways of carrying out this invention are illustrated in the following examples. It is to be understood that we are not confined to these examples but are merely giving them to illustrate the process. In these examples the amylase unit of activity is based on a saccharogenic method, while the protease unit is based on the hydrolysis of a protein as followed by the well-known Van Slyke method. The important point is not the specific method used here for determining amylase or protease but the ratio between these two units as affected by the treatment described.

The following examples are intended to illustrate the invention but not to limit it to the exact details shown since it may be otherwise practised within the scope of the appended claims.

The aluminum hydroxide "C gamma" mentioned in the examples and claims is made by precipitating aluminum hydroxide from a solution of aluminum sulfate by means of dilute ammonium hydroxide, washing free of sulfates and allowing the washed aluminum hydroxide to age at least fifty days, suspended in water. (See Waldschmidt-Leitz-Die Enzyme, Vieweg & Sohn, 1925.)

*Example 1.*—1000 grams of finely ground barley malt was stirred with 2500 cc. of water, allowed to stand for 20 hours, and filtered. The clear filtrate was then diluted with an equal volume of water. One cubic centimeter of this extract contained 0.1823 amylase unit and 0.00207 protease unit. Fifty cc. of the extract was buffered to pH 6.8 with 5 cc. phosphate in the usual manner, and then there was added to it 12.5 cc. of a suspension of aluminum hydroxide containing 10 milligrams aluminum oxide per cubic centimeter. After the mixture had stood a few minutes in ice water the clear liquor was obtained by centrifuging. One cubic centimeter of this treated solution was now found to contain 0.10195 amylase unit and 0.000323 protease unit. Thus the ratio amylase:protease had been increased from 88 to 316.

The adsorbent recovered from the above liquor was used to treat a second 50 cc. sample of untreated extract. In this case the ratio amylase: protease was increased from 88 to 208. Furthermore in this case the recovery of amylase itself was 101%, indicating that the adsorbent had released some of the amylase adsorbed during its first use.

The adsorbent recovered from the second liquor was used to treat a third 50 cc. sample of untreated extract. In this case the ratio amylase: protease increased from 88 to 172. The recovery of amylase was again 101%.

Thus the same adsorbent was used on three successive lots of extract, with an average recovery of amylase of 92% and average increase in amylase:protease ratio from 88 to 232.

*Example 2.*—50 cc. of a malt extract prepared and buffered as in Example 1 was treated with 12.5 cc. of a 3% suspension of commercial aluminum oxide. After separating the adsorbent by centrifuging, the clear liquor showed an increase in amylase:protease ratio from 88 to 209, with a recovery of 97% of amylase.

The adsorbent recovered from the above liquor was used to treat a second 50 cc. portion of untreated extract. The amylase:protease ratio was increased from 88 to 125, and 101% of the amylase was recovered.

*Example 3.*—A sample of malt extract which had had its amylase:protease ratio increased to 200 by treatment with commercial aluminum oxide was evaporated at 30° C. at low pressure to a syrup. The amylase:protease ratio in the syrup was 405.

*Example 4.*—3 portions of 25 cc. each of a malt extract prepared as in Example 1, with an amylase:protease ratio of 215, were treated with 2, 5 and 10 gms., respectively, of Arkansas bauxite, after removing the adsorbent the clear liquors had ratios of 240, 314, and 410, respectively.

*Example 5.*—Twenty-five cc. of an extract of pig pancreas was cooled to 0° C., buffered with phosphates to a pH of 7.0, stirred with 6 gm. of Georgia bauxite, and centrifuged. Before treatment the amylase-protease ratio was 1.58; after treatment it was 1.68, with no loss in the amylase activity.

*Example 6.*—One hundred grams of a dried culture of Aspergillus oryzae grown on bran was soaked with 400 cc. water for 20 hours, then filtered. Fifty cc. of this extract was buffered with phosphates to pH 6.5, stirred with 10 gm. Georgia bauxite and centrifuged. Before treatment the amylase-protease ratio of the extract was 1.97; after treatment it was 2.14, with no loss in the amylase activity.

*Example 7.*—Two hundred forty cc. of mold extract prepared as in Example 6 was buffered with phosphates to pH 7.0, cooled to 0° C., 20 cc. of specially prepared aluminum hydroxide suspension known as C gamma stirred in, and centrifuged. The extract before treatment had an amylase-protease ratio of 2.31; after treatment, 2.8. The treated extract was given a second dose of 30 cc. of the aluminum hydroxide suspension, and centrifuged. The amylase-protease ratio had increased to 3.04.

*Example 8.*—Fifty cc. of a rather dilute malt extract was buffered with phosphate to pH 7.0, 10 cc. of the special aluminum hydroxide suspension mentioned in Example 7 (1 cc. containing 17 mg. $Al_2O_3$) stirred in, and centrifuged. Before treatment the amylase-protease ratio was 375; after treatment it was infinity. The recovery of amylase was 69%, and it was completely free from protease.

*Example 9.*—To 40 cc. of ordinary malt extract buffered with phosphate to pH 7.0 were added 4 cc. of a 5% solution of blood albumin. After standing 1 hour at 30° C., 25 cc. of it was mixed with 25 cc. water, cooled to 0° C., mixed with 8 cc. of aluminum hydroxide C gamma (1 cc. containing 17 mg. $Al_2O_3$), stirred for several minutes, and centrifuged. Before treatment the extract had an amylase-protease ratio of 372; after treatment no protease could be detected, while 73% of the amylase was recovered.

*Example 10.*—A solution of the enzymes from a culture of the bacterium *Bacillus subtilis-mesentericus*, containing both amylase and protease, was diluted with an equal volume of water, and buffered with phosphate to pH 7.0. To 24 cc. of this solution was added, successively, 6, 7, 5, and 10 cc. of aluminum hydroxide C gamma (1 cc. containing 20.4 mg. $Al_2O_3$), centrifuging off the aluminum hydroxide after each treatment. The aluminum hydroxide from the last treatment was suspended in 10 cc. of monopotassium phosphate to elute the adsorbed protease. The original solution had a protease-amylase ratio of 1.54. The elution solution had a ratio of infinity. Thus this example illustrates not only the recovery of protease which has been adsorbed, but also the preparation of protease completely free from amylase

*Example 11.*—Three grams of commercial aluminum oxide was stirred into 25 cc. of bacterial enzymes, such as used in Example 10, buffered with phosphates to pH 4.5. The aluminum oxide was centrifuged off and suspended in 12.5 cc. of phosphate buffer of pH 8.0. After stirring a few minutes the aluminum oxide was removed by centrifuging. The original enzyme solution had an amylase-protease ratio of 0.66. The final elution had a ratio of 1.17. Thus this example illustrates the adsorption of bacterial amylase and its subsequent removal by elution to give a solution relatively lower in protease.

In the specification and claims the term "amylase" and "amylolytic enzyme" means an enzyme of any origin capable of hydrolyzing starch, glycogen or dextrine. By the term "protease" and "proteolytic enzyme" is meant any enzyme of any origin capable of hydrolyzing proteins, proteoses or peptones.

We claim:

1. The process of increasing the ratio of amylolytic to proteolytic enzymes in a dispersion containing both enzymes which comprises preferentially adsorbing the proteases on bauxite.

2. The process of increasing the ratio of amylolytic to proteolytic enzymes in a dispersion containing both enzymes which comprises mixing bauxite with the dispersion and subsequently separating the liquid from the bauxite.

3. The process of increasing the ratio of amylolytic to proteolytic enzymes in a dispersion containing both enzymes which comprises mixing bauxite with a dispersion at a pH of from 5.5 to 7.5 and subsequently separating the liquid from the bauxite.

4. The process of increasing the ratio of amylolytic to proteolytic enzymes of vegetable origin which comprises mixing bauxite with an aqueous dispersion of the enzymes and subsequently separating the liquid from the bauxite.

5. The process of increasing the ratio of amylolytic to proteolytic enzymes in a malt extract containing both enzymes which comprises mixing bauxite with the extract, subsequently separating the liquid from the bauxite and reducing it to a syrup by evaporating part of the liquid at about 30° C.

6. The process of preparing vegetal amylolytic enzymes substantially free of proteolytic enzymes which comprises adding bauxite to a dispersion containing both enzymes at a pH of approximately 7 and subsequently separating the liquid from the bauxite.

ERNST WALDSCHMIDT-LEITZ.
FRITZ ZIEGLER.